United States Patent
Yao et al.

(10) Patent No.: US 7,990,991 B2
(45) Date of Patent: Aug. 2, 2011

(54) SYSTEM OF EXTENDING ADDRESS ON ATM UNIVERSAL TEST OPERATION INTERFACE BUS AND THE METHOD THEREOF

(75) Inventors: Changkong Yao, Shenzhen (CN); Guosheng Wu, Shenzhen (CN); Weifeng Shi, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 540 days.

(21) Appl. No.: 11/664,951

(22) PCT Filed: Sep. 9, 2005

(86) PCT No.: PCT/CN2005/001451
§ 371 (c)(1),
(2), (4) Date: Apr. 9, 2007

(87) PCT Pub. No.: WO2006/037262
PCT Pub. Date: Apr. 13, 2006

(65) Prior Publication Data
US 2009/0010266 A1  Jan. 8, 2009

(30) Foreign Application Priority Data
Oct. 9, 2004  (CN) .................. 2004 1 00009640

(51) Int. Cl.
*H04L 12/50* (2006.01)
*H04L 12/28* (2006.01)

(52) U.S. Cl. ..... 370/419; 370/359; 370/392; 370/395.1; 370/395.53; 370/397

(58) Field of Classification Search ........................ None
See application file for complete search history.

(56) References Cited

U.S. PATENT DOCUMENTS

| | | | |
|---|---|---|---|
| 5,774,465 A * | 6/1998 | Lau et al. ................... | 370/395.3 |
| 5,982,772 A * | 11/1999 | Oskouy ....................... | 370/395.7 |
| 5,999,528 A * | 12/1999 | Chow et al. ................. | 370/365 |
| 6,343,077 B1* | 1/2002 | Chin et al. .................. | 370/395.6 |
| 2002/0021668 A1* | 2/2002 | Yorinaga et al. ............. | 370/233 |
| 2002/0062223 A1* | 5/2002 | Waugh ......................... | 705/1 |
| 2003/0093563 A1* | 5/2003 | Young et al. ................. | 709/245 |
| 2003/0206550 A1* | 11/2003 | Shanley ....................... | 370/395.1 |
| 2005/0286529 A1* | 12/2005 | Arulambalam et al. ... | 370/395.1 |

FOREIGN PATENT DOCUMENTS

| | | |
|---|---|---|
| GB | 2269724 A | 2/1994 |
| KR | 349805 B1 | 8/2002 |
| KR | 2003054192 A | 7/2003 |

* cited by examiner

*Primary Examiner* — Daniel J Ryman
*Assistant Examiner* — Thinh Tran
(74) *Attorney, Agent, or Firm* — Thomas, Kayden, Horstemeyer & Risley, LLP (57) ABSTRACT

The system of this invention for extending address on UTOPIA and the method thereof can extend the single PHY on the ATM switching chip bus to many PHY ports easily without increasing too much cost, and thus increase the application flexibility of corresponding ATM switching chips. Evidently, there would be still many other embodiments of the invention, the people skilled in the art can make a variety of corresponding changes and transformations in accordance with the invention without departing from its spirit and essential, but these corresponding changes and transformations should also be in the protection range of the claims of this invention.

10 Claims, 5 Drawing Sheets

SYSTEM OF EXTENDING ADDRESS ON ATM UNIVERSAL TEST OPERATION INTERFACE BUS AND THE METHOD THEREOF

TECHNICAL FIELD

The invention relates to a system for extending single address to multi-addresses on Universal Test and Operations PHY Interface for ATM (UTOPIA) in ATM (asynchronous transfer mode) switching system and the method thereof, especially relates to a system for extending address by looking up ATM VP (virtual path)/VC (virtual channel) table and switching and the method thereof.

TECHNICAL BACKGROUND

In ATM switching system, VP/VC switching between a plurality of physical ports is usually required, with one typical example being DSLAM (Digital Subscriber Line Access Multiplexer). Generally speaking, one DSLAM device needs to provide several network side interfaces and several subscriber ports. But many ATM switching chips provide only one UTOPIA (L2) interface, which is apparently unable to satisfy the requirements in most cases, for example, small size DSLAM usually demands subscriber interfaces over 32. Therefore, the UTOPIA address extension for ATM switching chips is inevitable. Some chips extend address by the way of multiple multiplexing through self-defined interface such as Any-PHY interface. However, this way has its own limitation—both the ATM switching chip and the physical layer chip must accept the self-defined private interface, setting restriction on the system flexibility.

In the PHY address extension technique, there must be an interface to identify the different ports after extension. The general method is to add port identifier at the ATM cell head. But many ATM switching chips only provide interfaces for users modifying VPI/VCI (some chips provide private interface in user defined range H5/UDF). Therefore, adding port identifier in VPI/VCI can be considered as a universal method ("universal" here means that this method is not limited to the chip types). But, the above method also has the following defects: the space of the VP/VC table in the switching chips is limited, for example, if the space of the VC table for the use of the port needing extension is 4K, and this port is to be extended to 32 ports, then 5 bit is needed to identify the ports, then the valid VPI/VCI can only be 7 bit, thus the valid VPI/VCI value is limited. In DSLAM system, the demand on the connection number that each port on the subscriber side can support is not high (for example, each MODEM supports 8 connections), but the VPI/VCI value of these connection is not restricted (VPI: 0~255, VCI: 0~65535), so 7 bit VPI+VCI is evidently insufficient. If extension for more ports has to be supported, for example, the large sized DSLAM demands subscriber ports over 1 k, it is even more insufficient.

SUMMARY OF THE INVENTION

The technical problem to be solved by the invention is to provide a system for extending address on UTOPIA and the method thereof. This invention is able to extend a single address (PHY port) on UTOPIA bus to multiple addresses (PHY port) in ATM switching system without demanding that the ATM switching chip supports a certain private interface, and without limitation to the VPI/VCI value of each PHY port.

For the purpose above, the invention provides a conversion module for conversion between different interfaces, and for VPI, VCI switching between different ports by dividing VPI/VCI inside the switching chip and establishing a particular VP/VC table in the conversion module.

Specifically, the present invention provides a system for extending address on UTOPIA, which is applied in ATM switching system and used for extending a single address on UTOPIA to multiple addresses, and is characterized in including:

an ATM switching chip, inside which VPI/VCI are divided with a predetermined rule, the application layer identifies the ports according to the said division;

a conversion module, in which a VP table and a VC table are established, the VPI and VCI switching between different ports is achieved by looking up the VP/VC table, the conversion module connects with the ATM switching chip through the UTOPIA, the ATM switching chip is a master device and the conversion module is a slave device; and a plurality of physical layer chips, connected with the conversion module through standard interface or un-standard interface according to the number of the physical ports to be supported, the conversion module is a master device and the physical layer chips are slave devices.

The above system for extending address on UTOPIA is characterized in that the conversion module further provides a host interface for software maintaining the VP/VC table.

The invention also provides a method for extending address on UTOPIA, characterized in including the following steps of:

constructing a system for extending address on UTOPIA, said system comprising an ATM switching chip and a conversion module which are connected through UTOPIA, said conversion module also connecting with a plurality of physical layer chips;

dividing the VPI/VCI in the ATM switching chip with a predetermined rule;

establishing a VP table and a VC table inside the conversion module;

switching the VPI and VCI between different ports by looking up the VP/VC table upstream and downstream, and completing a cell routing.

The above method for extending address on UTOPIA is characterized in that the VP/VC table only deposits the VPI/VCI of the subscriber side, and the VPI/VCI of the ATM switching chip side is hidden in the address information of the cell.

The above method for extending address on UTOPIA is characterized in that the VPI/VCI inside the ATM switching chip is divided with the following predetermined rule:

if VPI=0, it is considered as a VC connection;

when VPI=0, VCI corresponds to different ports after extension according to ranges, VCI is distributed continuously from 32, each port includes m continuous VCI values:

vci=(portId<<n)+index+32, in which m is $2^n$, portId is the number of the ports after extension, the sign "<<" means shifting n bits to the left, and index is (0~(m−1));

the space that the conversion module port has to occupy in the VC table inside the switching chip is (portId*m+32);

the VCI seen by the switching chip is only visible inside the chip and is shielded for outside;

the cell with VPI≠0 is performed VP switching;

VPI, except for vpi=0, corresponds to different ports after extension according to ranges, VPI is distributed continuously from 1, each port includes i continuous VPI values:

vpi=portId<<j+index+1, in which i is $2^j$, portId is the number of the ports after extension, index is (0~(i−1)); and the space that the conversion module port has to occupy in the VP table inside the switching chip is (portId*i+1).

The above method for extending address on UTOPIA is characterized in that the VP table provides i items for each port, each item corresponds to one VP connection, each item includes 9 bits, among which, Bit8 is flag, Bit7~0 is VPI and the range is 0~255; the flag is used to indicate whether the connection is valid or not, if flag=1, the connection is valid, if flag=0, the connection is invalid; and the table address space is distributed continuously, with a total of portId*1 addresses.

The above method for extending address on UTOPIA is characterized in that the VC table provides m items for each port, each item corresponds to one VC connection, each item includes 25 bits, among which Bit24 is flag, Bit23~16 is VPI, Bit15~0 is VCI, and the supported VPI and VCI ranges are 0~255 and 0~65535 respectively, the flag is used to indicate whether the connection is valid, if flag=1, the connection is valid, if flag=0, the connection is invalid; and the table address space is distributed continuously, with a total of portId*m addresses.

The above method for extending address on UTOPIA is characterized in that the process of the cell looking up table and routing in upstream direction is as follows:

the conversion module receiving an upstream ATM cell and obtaining the source port address portId of the cell;

looking up the VP table to match the VPI in cell head throughout all the items under the source port of the VP table in the conversion module;

if the matched item being found, converting the VPI to be the address of the item in the VP table plus 1, keeping VCI unchanged, transmitting the cell to the UTOPIA, thus completing the upstream cell routing once;

if no matched item being found, continuing looking up the VP table to match the VPI/VCI in cell head throughout all the items under the source port of the VC table in the conversion module, if the matched item being found, setting the VPI as 0, substituting the VCI by the address of the item in the VC table plus 32, transmitting the cell to the UTOPIA, thus completing the upstream cell routing once; otherwise, discarding the cell and waiting for the next cell.

The above method for extending address on UTOPIA is characterized in that the process of the cell looking up table and routing in downstream direction is as follows:

the conversion module receiving a downstream ATM cell and obtaining the VPI value from the cell head;

if VPI=0, it being a VC connection, looking up the VC table, obtaining the VCI value from the cell head, then directly indexing No. (VCI-32) item of the VC table in the conversion module, obtaining the port address portId, checking whether the flag bit of the connection is 1, if flag=1, the connection is valid, substituting the VPI and VCI values of the item for the VPI and VCI values of the cell, then transmitting the cell to the port address portId, thus completing the downstream cell routing once; if flag=0, the connection being invalid, discarding the cell;

if VPI≠0, it being VP connection, looking up VP table, directly indexing No. (VPI-1) item of the VP table in the conversion module, obtaining the port address portId, checking whether the flag bit of the connection is 1, if flag=1, the connection being valid, substituting the VPI value of the item for the VPI value of the cell, keeping the VCI value unchanged, then transmitting the cell to the port address portId, thus completing the downstream cell routing once; if flag=0, the connection being invalid, discarding the cell.

The above method for extending address on UTOPIA is characterized in that the conversion module also provides a host interface for software maintaining the VP/VC table, said maintenance includes:

reading and writing all the table items through the host CPU;

setting loop back of two ends through the host CPU;

protecting exterior reading/writing and the interior reading to avoid malfunction due to simultaneous operations; and protecting the operation of looking up table upstream and downstream.

This invention can extend single PHY on ATM switching chip bus to multiple PHY ports conveniently without increasing much cost, thus improve the application flexibility of related ATM switching chips.

Hereinafter, the invention will be illustrated in detail in combination with drawings and embodiment examples which, however, should not set limitations to the invention.

PREFERRED EMBODIMENTS OF THE INVENTION

Hereinafter, the embodiments of the technical scheme of this invention will be discussed in detail in combination with the drawings.

Figure 1:
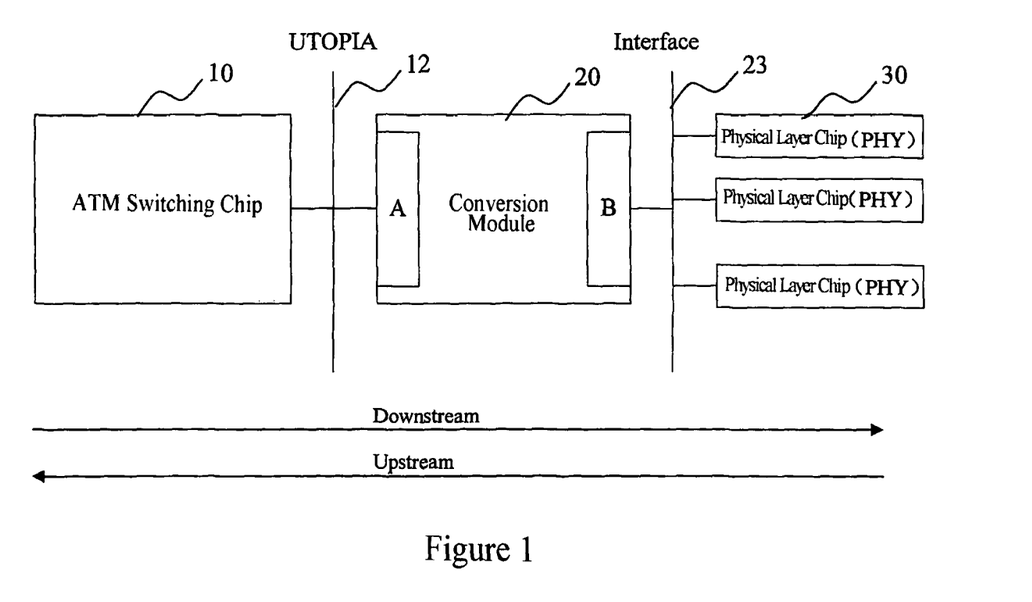
FIG. 1 is a block diagram of hardware according to the method of this invention.

The hardware block diagram of the invention is shown as FIG. 1: including an ATM switching chip 10, a conversion module 20, and several PHY chips 30 (physical layer chips), in which the ATM switching chip and the conversion module are connected through UTOPIA standard interface L2 (it can be either L1 or L2), the ATM switching chip 10 is a master device, the conversion module 20 is a slave device, the conversion module 20 occupies a PHY address (interface A as shown in the figure); the interface 23 between the conversion module 20 and the PHY chips 30 can be either standard interface or nonstandard interface (interface B as shown in the figure) depending on the number of the PHY ports to be supported, the conversion module 20 is a master device, the PHY chips 30 are slave devices. For example, if it is to extend to 32 PHY ports, the interface B of the conversion module can be UTOPIA L2; if it is to extend to 1024 PHY interfaces, such interfaces as Any-PHY can be considered. The specific realization of the interface B will not be illustrated in this invention.

In this invention, the different ports (here refer to the ports after extension) are distinguished by dividing the VPI/VCI inside the ATM switching chip according to different ranges. The application layer can identify the ports according to such division method. The specific division method will be illustrated in the following description. In order to realize the switch from the VPI/VCI inside the ATM switching chip to the VPI/VCI of the subscriber port, this invention designs a VP/VC table and a corresponding looking up method in the conversion module. The arrangement of the VP/VC table takes both the utilization rate of RAM space and the efficiency of table looking up into consideration: the table only deposits the VPI/VCI of the subscriber side, and the VPI/VCI of the switching chip side is hidden in the address information, thus compared with the common VP/VC table, this VP/VC table saves half of the space; table looking up:

when in downstream direction (the direction of downstream as shown in FIG. 1), it adopts direct mapping of VPI/VCI to table address, fully ensuring the efficiency: the conversion module receives the ATM cell from UTOPIA bus, and judges whether it is VC table looking up or VP table looking up being needed according to whether VPI=0, if it is VP table looking up being needed, indexes No. (VPI-1) item of the VP table in the conversion module directly, and substitutes the VPI of the item for the VPI of the cell head, transmits the VCI of the cell head transparently; if it is VC table looking up being needed, indexes out No. (VCI-32) item of the VC table in the conversion module directly, and substitutes the VPI and VCI of the item for the VPI and VCI of the cell.

when in upstream direction (the direction of upstream as shown in FIG. 1), the maximum times for looking up the table is the maximum number of connections that each port can support: the conversion module receives the ATM cell from interface B in FIG. 1, obtains source port number of the cell, and looks up the VP table (going through all the items of the VP table under the port in the conversion module to match the VPI in cell head), if the matched item is found, converts the VPI into the address of the item in the VP table plus 1, keeps the VCI unchanged; if no matched item is found, continues to look up the VC table (going through all the items of the VC table under the port in the conversion module to match the VPI/VCI in cell head), if matched item is found, sets the VPI as 0, and substitutes the VCI with the address of the item in the VC table plus 32.

Through switching of the upstream and downstream table looking up, the cell routing between the switching chip and each PHY chip is realized. The design of the VP/VC table and its looking up method will be illustrated in the following description.

Figure 6:
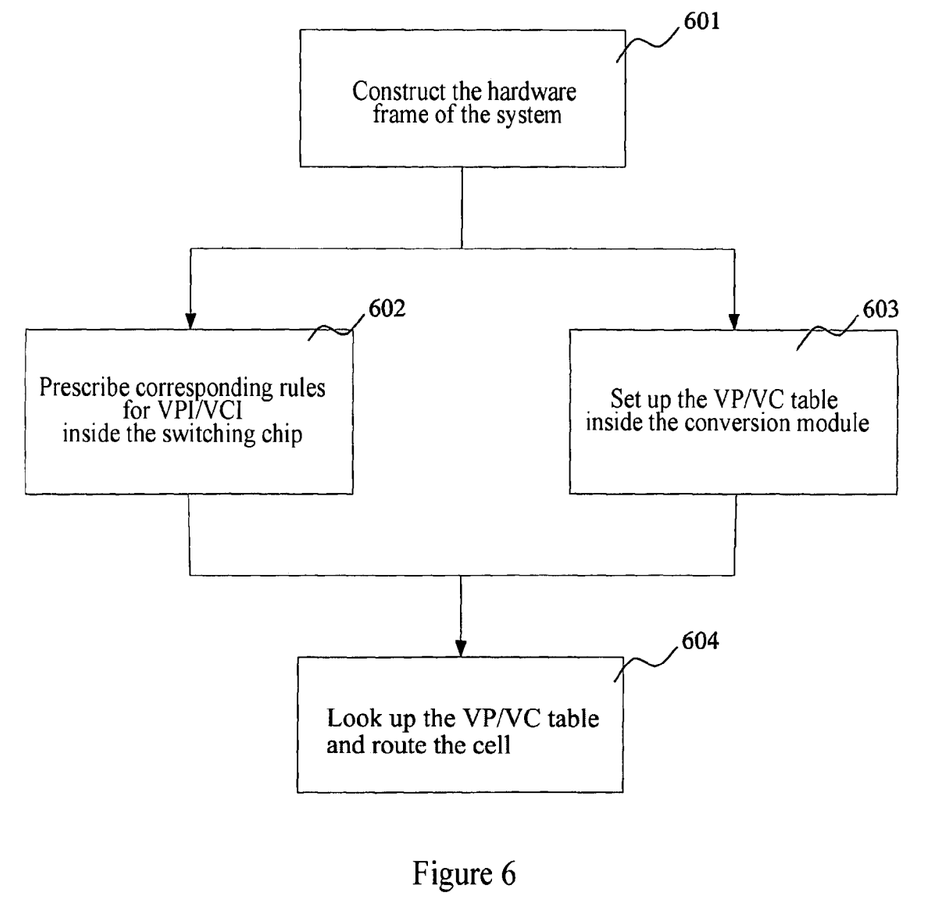
FIG. 6 shows the steps for realizing the system of this invention.

The implementation of the system of this invention mainly includes construction of hardware model, prescription of restriction conditions and design of software processing flow. FIG. 6 illustrates the steps for implementing the system:

Step 601, first constructing the hardware model:

the hardware model is shown as FIG. 1: including an ATM switching chip, a conversion module and several PHY chips, in which the ATM switching chip and the conversion module are connected through UTOPIA standard interface, the ATM switching chip is a master device, the conversion module is a slave device, the conversion module occupies one PHY address (interface A as shown in the figure); the conversion module and the PHY chips are connected through either standard interface or nonstandard interface (interface B as shown in the figure) depending on the number of the PHY ports to be supported, the conversion module is a master device, and the PHY chips are slave devices.

Figure 2:
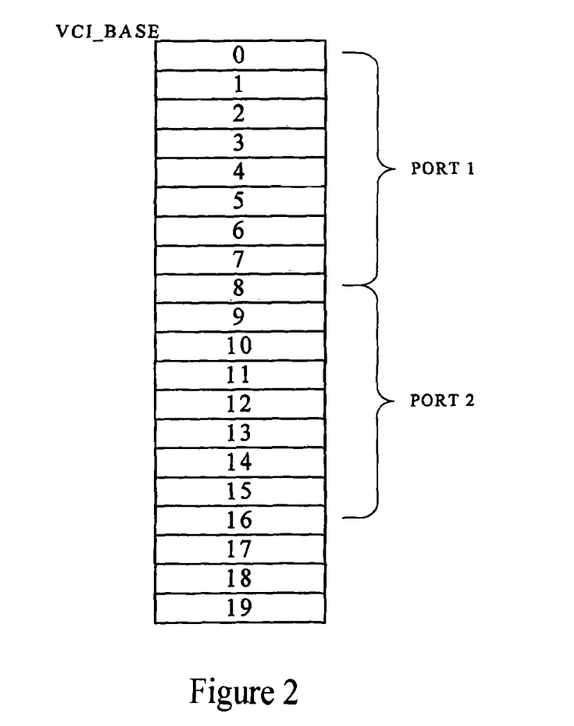
FIG. 2 is a schematic view for dividing the VCI inside the switching chip based on the ports according to this invention.
Figure 3:
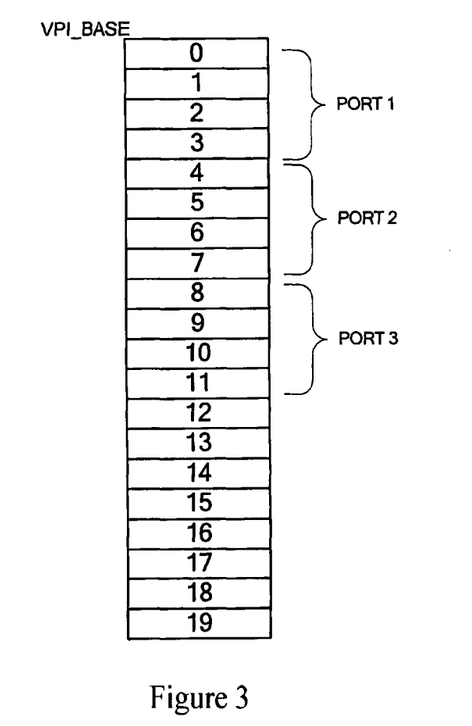
FIG. 3 is a schematic view for dividing the VPI inside the switching chip based on the ports according to this invention.

Step 602, prescribing the restriction conditions, including prescription for the VPI/VCI inside the switching chip: making the following prescriptions for the VPI/VCI on the port of the conversion module inside the switching chip:

(1) if VPI=0 (or other fixed values), it being considered to be VC connection;

(2) when VPI=0, VCI corresponding to different ports (the ports after extension) according to ranges, distributing VCI continuously from 32, each port including m consecutive VCI values (m is $2^n$): vci=(portId<<n)+index+32, in which, portId is the number of the ports after extension, index is (0~(m−1)) as illustrated in FIG. 2 (in the figure, it is assumed m=8, i.e. each port supports eight VC connections);

(3) the port of the conversion module occupying the space (portId*m+32) of the VC table inside the switching chip (assuming portId=1024, m=8, the required space of the VC table being: 32+1024*8=8224);

(4) VCI seen by the switching chip only being visible inside the chip, and being shielded for the outside;

(5) conducting VP switching for the cell with VPI≠0;

(6) VPI (except for vpi=0) corresponding to different ports according to the ranges, distributing the VPI continuously from 1, each port including i (i is $2^j$) consecutive VPI values: vpi=portId<<j+index+1, wherein portId is the number of the ports after extension, index is (0~(i−1)) as illustrated in FIG. 3 (in the figure, it is assumed i=4, i.e. each port supports four VP connections);

(7) the port of the conversion module having to occupy the space (portId*i+1) of the VP table inside the switching chip.

Figure 4:
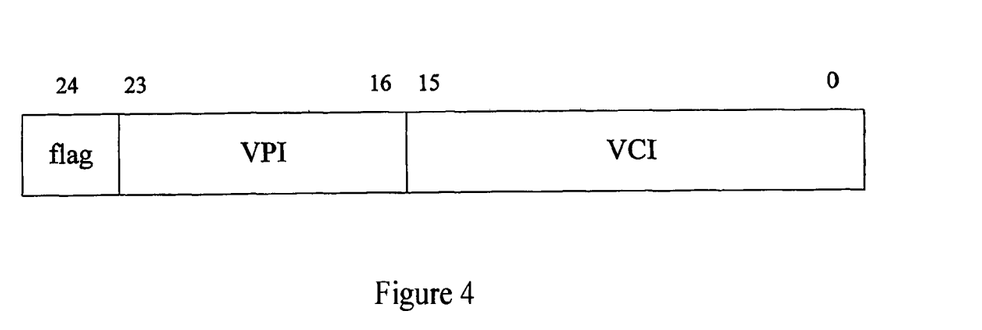
FIG. 4 is a schematic view of the VC table items in the conversion module according to this invention.
Figure 5:
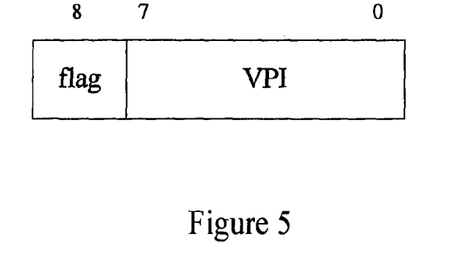
FIG. 5 is a schematic view of the VP table items in the conversion module according to this invention.

Step 603, establishing VP/VC table looking up in the conversion module and the conversion module providing the interface for the host:

(I) establishing a VP table and a VC table in the conversion module:

the establishing of the VC table is shown as FIG. 4:

(1) each port provides m items (in the figure, m=8), each item corresponds to one VC connection;

(2) each item is 25 bits, in which, Bit24 is flag, Bit23~16 is VPI, Bit15~0 is VCI, the supported VPI and VCI ranges are 0~255 and 0~65535 respectively; taking UNI interface for example, if it is NNI interface to be supported, the item has to be increased to 29 bits, in which, Bit28 is flag, Bit27~16 is VPI, Bit15~0 is VCI, the supported VPI and VCI ranges are 0~4095 and 0~65535 respectively;

(3) the table address space is distributed continuously with a total of portId*m addresses;

(4) Flag is used to illustrate whether the connection is valid, if flag=1, the connection is valid, if flag=0, the connection is invalid.

the establishing of the VP table is shown in FIG. 5:

(1) each port provides i items (in the figure, i=4), each item corresponds to one VP connection;

(2) each item is 9 bits, in which Bit8 is flag, Bit7~0 is VPI, the range is 0~255; taking UNI interface for example, if it is NNI interface to be supported, the item has to be increased to 13 bits, in which, Bit12 is flag, Bit11~0 is VPI, the supported VPI range is 0~4095;

(3) the table address space is distributed continuously, with a total of portId*i=192 addresses;

(4) Flag is used to illustrate whether the connection is valid, if flag=1, the connection is valid, if flag=0, the connection is invalid.

(II) the conversion module having to provide the host interface for the software maintaining the VP/VC table, said maintenance including:

(1) being able to read and write all the table items through host CPU, refresh the whole table, and modify one single table item;

(2) being able to set loop back of two ends through the host CPU;

(3) protecting exterior read/write and interior read in order to avoid malfunction resulting from simultaneous operations; and (4) protecting the operation of looking up table upstream and downstream (such as double port RAM).

Figure 7:
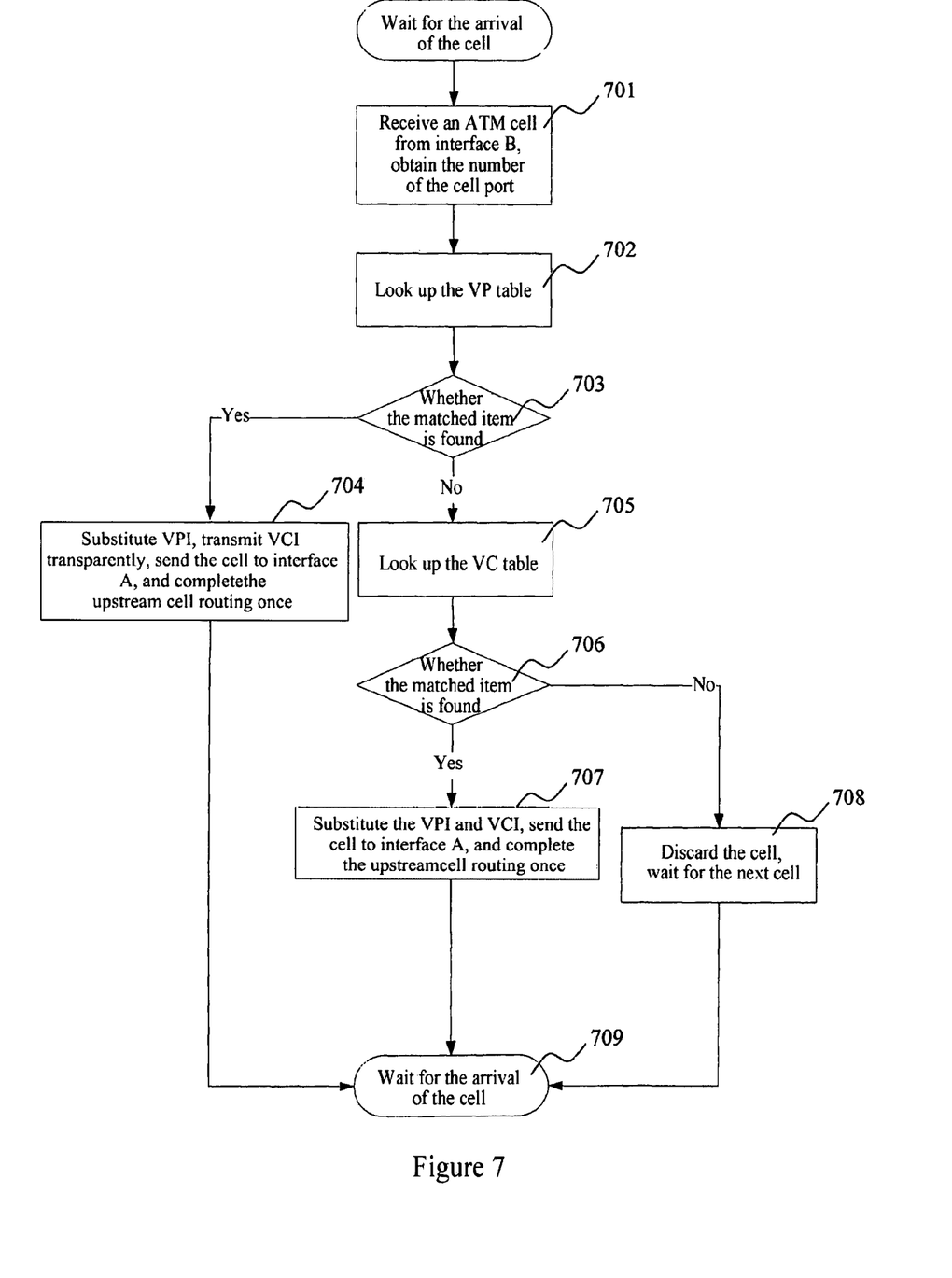
FIG. 7 is a flow chart for the cell looking up table and routing in upstream direction according to this invention.
Figure 8:
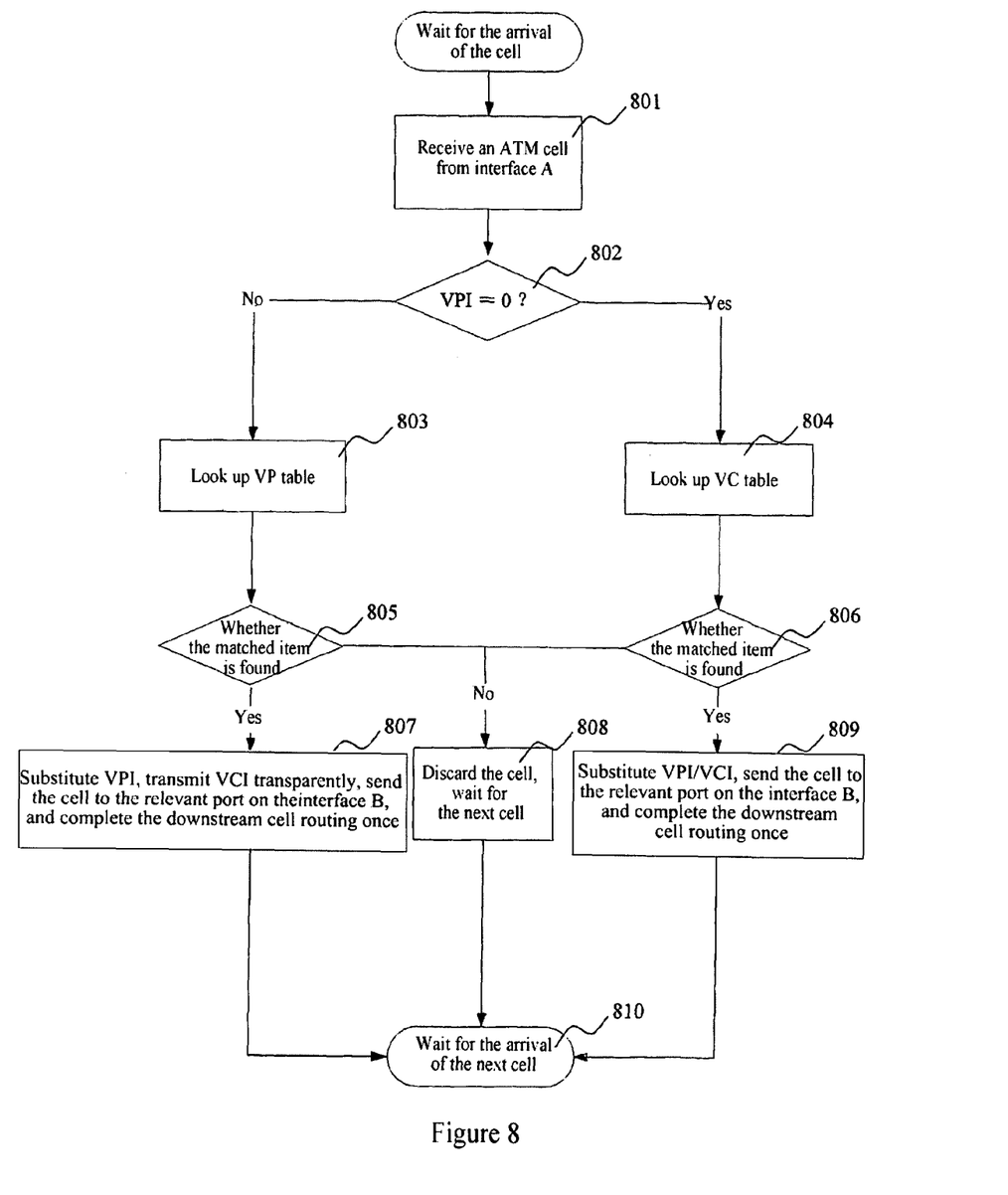
FIG. 8 is a flow chart for the cell looking up the table and routing in downstream direction according to this invention.

The design of software processing flow (processing flow of cell looking up table and routing) is shown in FIGS. 7 and 8:

for the upstream direction (the upstream direction in FIG. 1), it is shown as FIG. 7:

Step 701, after the cell entering from interface B, the conversion module obtaining the PHY port number of the cell: portId;

Step 702, looking up the VP table, calculating the base address of the port in the VP table to be VP_TABLE_BASE_ADDR+i×portId (VP_TABLE_BASE_ADDR is the base address of the whole VP table, i is the maximum number of VP connections that each port can support), then searching by going throughout i items;

Step 703, determining whether the matched item being found, that is if flag=0, omitting the item and turning to step 705; if flag=1, comparing the VPI value of the item with the VPI value of the cell head and deciding whether they are equal, if yes, it being VP connection, turning to step 704;

Step 704, substituting the VPI (8 bits) of the cell head with the address offset (relative to VP_TABLE_BASE_ADDR) of the item in the VP table plus 1, and transmitting the VCI values transparently; transmitting the cell to interface A, completing upstream cell routing once; at the same time, continuing to wait for the arrival of the next cell (step 709);

Step 705, if there being no matched item among all the items of the VP table, continuing to look up the VC table, deciding that the base address of the port in the VC table is VC_TABLE_BASE_ADDR+m×portId (VP_TABLE_BASE_ADDR is the base address of the whole VC table, m is the maximum number of VC connections that each port can support), then searching by going throughout m items;

Step 706, deciding whether the matched item being found, that is if flag=0, omitting the item, and turning to step 708; if flag=1, comparing VPI value with VCI value and deciding whether they are equal, if yes, it being VC connection, and turning to step 707;

Step 707, substituting the VPI value of the cell head with 0, and substituting the 16 bit VCI with the address offset (relative to VP_TABLE_BASE_ADDR) of the item in the VC table plus 32; at the same time, continuing to wait for the arrival of the next cell (step 709);

Step 708, if there being no matched item in the VC table either, discarding the cell;

Step 709, continuing to wait for the arrival of the next cell.

for the downstream direction (the downstream direction in FIG. 1), it is shown as FIG. 8:

Step 801, receiving a cell from interface A, said cell being transmitted from the ATM switching chip, extracting the value of VPI (8 bit) from the cell head;

Step 802, if VPI=0, it being VC connection, and turning to step 804; if VPI≠0, it being VP connection, and turning to step 803;

Step 803, looking up the VP table for VP connection; extracting the VPI value from the cell head, (VPI-1)>>j (i refers to the maximum number of VP connections supported by each port, i is $2^j$), and obtaining portId; using (VPI-1) as the address to index the items of the VP table directly, checking whether the flag bit of the connection being 1 to decide whether the matched item being found (step 805), if flag=1, the connection being valid, extracting the VPI value from the item to substitute the 8 bit VPI value of the cell head, transmitting the VCI value of the cell head transparently, then transmitting the cell to the port portId, and completing the downstream cell routing once (step 807), at the same time continuing to wait for the arrival of the next cell (step 810); if flag=0, the connection being invalid, discarding the cell (step 809), and at the same time continuing to wait for the arrival of the next cell (step 810);

Step 804, looking up VC table for VC connection; extracting the VCI value from the cell head, (VCI-32)>>n (m refers to the maximum number of the VC connections supported by each port, m is $2^n$), and obtaining the portId; using (VCI-32) as the address to index the items of the VC table directly, checking whether the flag bit of the connection being 1 to decide whether the matched item being found (step 806), if flag=1, the connection being valid, extracting the VPI (8 bit)/VCI (16 bit) of the item to substitute the VPI (8 bit)/VCI (16 bit) of the cell, then transmitting the cell to the port portId, and completing the downstream cell routing once (step 808), at the same time continuing to wait for the arrival of the next cell (step 810); if flag=0, the connection being invalid, discarding the cell (step 809), and at the same time continuing to wait for the arrival of the next cell (step 810).

After the cell finishes the above procedures of looking up table, routing or discarding, the purpose that the system of this invention is designed for can be achieved.

INDUSTRIAL APPLICABILITY

The system for extending address on UTOPIA and the method thereof adopted in this invention can extend the single PHY on the ATM switching chip bus to many PHY ports conveniently without increasing much additional costs, thus improve the application flexibility of related ATM switching chips.

Evidently, this invention can also have many other embodiments. All of the corresponding changes and modifications that people skilled in the art can make based on this invention without departing from its spirit and essential should fall into the protection scope of the appended claims of this invention.

What we claim is:

1. A method for extending port on UTOPIA, characterized in including the following steps of:

constructing a system for extending port on the UTOPIA, the system including an ATM switching chip and a conversion module which are connected through the UTOPIA, the conversion module also connecting with a plurality of physical layer chips;

establishing a VP table and a VC table inside the conversion module that present a mapping relationship between VPI/VCI of the ATM switching chip and VPI/VCI of the plurality of physical layer chips, in the mapping relationship, if VPI in a cell received is equal to a predetermined value, the connection to the extended port is considered to be VC connection; otherwise the connection to the extended port is VP connection;

by looking up the VP and VC tables, the switch between the VPI/VCI of the ATM switching chip and the VPI/VCI of the plurality of physical layer chips being realized to complete a routing of the cell;

wherein the VP and VC tables only deposits the VPI/VCI of the plurality of physical layer chips, and the VPI/VCI of the ATM switching chip is hidden in address information of the cell;

wherein the mapping relationship between VPI/VCI of the ATM switching chip and VPI/VCI of the plurality of physical layer chips is designed as follows:

if VPI=0 in the cell, the connection to the extended port is considered to be a VC connection;

when VPI=0 in the cell, VCI corresponds to different ports after extension according to different ranges, the VCI is distributed continuously from 32, each port includes m consecutive VCI values: vci=(portId<<n)+index+32, in which m is $2^n$, portId is the number of ports after extension, the index is (0~(m−1)); a number of VCI in the ATM switching chip at least is (portId*m+32);

the VCI of the ATM switching chip is only visible inside the ATM switching chip, and is shielded for outside;

for the cell with VPI≠0, VP switch is implemented;

the VPI in the cell, except for vpi=0, corresponds to different ports after extension according to the ranges, VPI is distributed continuously from 1, each port includes i consecutive VPI values: vpi=portId<<j+index+1, in which i is $2^j$, portId is the number of the ports after extension, the index is (0~(i−1)); and a number of VPI in the ATM switching chip at least is (portId*i+1).

2. The method for extending port on the UTOPIA of claim 1, wherein the VP table provides i items for each port, each item corresponds to one VP connection, each item includes 9 bits, among which Bit8 is flag, Bit7~0 is VPI ranging from 0 to 255; the flag is for indicating whether the VP connection is valid, if flag=1, the VP connection is valid, if flag=0, the VP connection is invalid; and address spaces of the VP table are distributed continuously, with a total of portId*I addresses.

3. The method for extending port on the UTOPIA of claim 2, wherein the VC table provides i items for each port, each item corresponds to one VC connection, each item includes 25 bits, among which Bit24 is flag, Bit23-16 is VPI, Bit15-0 is VCI, and supported VPI and VCI ranges are 0~255 and 0~65535 respectively, the flag is for indicating whether the VC connection is valid, if flag=1, the VC connection is valid, if flag=0, the VC connection is invalid; and address spaces of the VC table are distributed continuously, with a total of portId*m addresses.

4. The method for extending port on the UTOPIA of claim 3, wherein the process of the cell looking up the table and routing in upstream direction is as follows:

the conversion module receiving an upstream ATM cell and obtaining a source port address portId of the upstream ATM cell;

going through all the items under the source port of the VP table in the conversion module, looking up the VP table to match the VPI in a cell head of the upstream ATM cell;

if matched item being found, converting the VPI in the cell head to the address of the item in the VP table plus 1, keeping VCI unchanged, transmitting the upstream ATM cell to the UTOPIA, and completing an upstream cell routing;

if no matched item being found, continuing going through all the items under the source port of the VC table in the conversion module, looking up the VP table to match the VPI/VCI in the cell head, if the matched item being found, setting the VPI as 0, substituting the VCI in the cell head with the address of the item in the VC table plus 32, transmitting the upstream ATM cell to the UTOPIA, and completing an upstream cell routing; otherwise, discarding the upstream ATM cell and waiting for a next cell.

5. The method for extending port on the UTOPIA of claim 3, wherein the process of the cell looking up the table and routing in downstream direction is as follows:

the conversion module receiving a downstream ATM cell and obtaining VPI value from a cell head of the downstream ATM cell;

if VPI=0 in the downstream ATM cell, the connection to the extended port being VC connection, looking up the VC table, directly indexing No. (VCI-32) item of the VC table in the conversion module after acquiring VCI value from the cell head of the downstream ATM cell, obtaining the port address portId, checking whether the flag bit of the VC connection is 1, if flag=1, the VC connection being valid, substituting the VPI and VCI values of the downstream ATM cell with the VPI and VCI values of the item, then transmitting the downstream ATM cell to the port address portId, and completing a downstream cell routing; if flag=0, the VC connection being invalid, discarding the downstream ATM cell;

if VPI≠0 in the downstream ATM cell, the connection to the extended port being VP connection, looking up VP table, directly indexing No. (VPI-1) item of the VP table in the conversion module, obtaining the port address portId, checking whether the flag bit of the VP connection is 1, if flag=1, the VP connection being valid, substituting the VPI value of the cell with the VPI value of the item, keeping the VCI value unchanged, then transmitting the downstream ATM cell to the port address portId, completing a downstream cell routing; if flag=0, the VP connection being invalid, discarding the downstream ATM cell.

6. The method for extending port on the UTOPIA of claim 1, characterized in that the conversion module also provides a host interface for software maintaining the VP and VC tables, the maintenance including:

reading and writing all the table items through a host CPU;

setting two ends loop back through the host CPU;

protecting exterior read/write and interior read to avoid malfunction resulting from simultaneous operations; and protecting upstream and downstream table looking up.

7. A system for extending port on Universal Test and Operations PHY Interface for ATM (UTOPIA), applied in ATM switching system for extending single port on the UTOPIA to multiple ports, wherein the system comprises:

an ATM switching chip;

a plurality of physical layer chips;

a conversion module, set with a VP table and a VC table which present a mapping relationship between VPI/VCI of the ATM switching chip and VPI/VCI of the plurality of physical layer chips, in the mapping relationship, if VPI in a cell received is equal to a predetermined value, the connection to the extended port is considered to be VC connection; otherwise the connection to the extended port is VP connection;

by looking up the VP and VC tables, the switch between the VPI/VCI of the ATM switching chip and the VPI/VCI of the plurality of physical layer chips being realized;

the conversion module and the ATM switching chip being connected through the UTOPIA, with the ATM switching chip being a master device and the conversion module being a slave device; and the plurality of physical layer chips being connected with the conversion module through a standard interface or a nonstandard interface according to the number of the physical ports to be supported, with the conversion module being a master device, and the physical layer chips being slave devices, wherein the VP and VC tables only deposits the VPI/VCI of the plurality of physical layer chips, and the VPI/VCI of the ATM switching chip is hidden in address information of the cell; and wherein the mapping relationship between VPIs and VCIs of the ATM switching chip and VPIs and VCIs of the plurality of physical layer chips is designed as follows:

if VPI=0 in the cell, the connection to the extended port is considered to be a VC connection;

when VPI=0 in the cell, VCI corresponds to different ports after extension according to different ranges, the VCI is distributed continuously from 32, each port includes m consecutive VCI values: vci= (portId<<n)+index+32, in which m is $2^n$, portId is the number of ports after extension, the index is (0~(m−1)); a number of VCI in the ATM switching chip at least is (portId*m+32);

the VCI of the ATM switching chip is only visible inside the ATM switching chip, and is shielded for outside; for the cell with VPI≠0, VP switch is implemented;

the VPI in the cell, except for vpi=0, corresponds to different ports after extension according to the ranges, VPI is distributed continuously from 1, each port includes i consecutive VPI values: vpi=portId<<j+index+1, in which i is $2^j$, portId is the number of the ports after extension, the index is (0~(i−1)); and a number of VPI in the ATM switching chip at least is (portId*i+1).

8. The system for extending port on the UTOPIA of claim 7, wherein the VP table provides i items for each port, each item corresponds to one VP connection, each item includes 9 bits, among which Bit8 is flag, Bit7~0 is VPI ranging from 0 to 255; the flag is for indicating whether the VP connection is valid, if flag=1, the VP connection is valid, if flag=0, the VP connection is invalid; and address spaces of the VP table are distributed continuously, with a total of portId*I addresses.

9. The system for extending port on the UTOPIA of claim 8, wherein the VC table provides i items for each port, each item corresponds to one VC connection, each item includes 25 bits, among which Bit24 is flag, Bit23-16 is VPI, Bit15-0 is VCI, and supported VPI and VCI ranges are 0~255 and 0~65535 respectively, the flag is for indicating whether the VC connection is valid, if flag=1, the VC connection is valid, if flag=0, the VC connection is invalid; and address spaces of the VC table are distributed continuously, with a total of portId*m addresses.

10. The system for extending port on the UTOPIA of claim 7, wherein the conversion module further provides a host interface for software maintaining the VP and VC tables.

* * * * *